United States Patent [19]
Van Roy

[11] Patent Number: 5,831,633
[45] Date of Patent: Nov. 3, 1998

[54] DESIGNATING, DRAWING AND COLORIZING GENERATED IMAGES BY COMPUTER

[76] Inventor: Peter L. Van Roy, 18 Bis Rue de Chartres, F-92200 Neuilly/Seine, France

[21] Appl. No.: 700,646

[22] Filed: Aug. 13, 1996

[51] Int. Cl.$^6$ .................................................. G06T 11/00
[52] U.S. Cl. ............................................................ 345/441
[58] Field of Search .................................... 345/441, 423, 345/428–433, 436–439

[56] References Cited

PUBLICATIONS

Foley et al. "Computer Graphics Principles and Practice" pp. 1020–1031, 1995.
Ansell "A Practical Introduction to Computer Graphics" pp. 10–23, 1981.
Wahl, et al, "Exploring Fractals on the Macintosh", Addison–Wesley, chapter 9 (pp. 283–295), 1994.
Mandelbrot B., "The Fractal Geometry of Nature", WH Freeman, pp. 34, 35, 46, 72, 73, plates C4, C5, 1983.
Briggs. J., "Fractals: The Patterns of Chaos", Simon & Schuster, pp. 64, 65, 76, 86, 87.
Lindenmayer & Prusinkiewicz, "The Algorthmic Beauty of Plants", Springer Verlag, Chapter 1 (pp. 1–35), p. 74.
Barnsley, M., "Fractals Everywhere", Academic Press, pp. 86–93.

*Primary Examiner*—Almis R. Jankus

[57] ABSTRACT

A method and system for drawing and designing highly complex and subtly-colored images with a very small amount of user input. By choosing this input, the graphic designer has full control over the shape and its colorization. The shape and its colorization are created independently. In this way, the graphic designer can easily create stylized geometric and natural forms. One embodiment is as a software program on a digital computer. The input can be given by direct manipulation. With this invention, the designer can create shapes with great detail that would be impractical to draw with existing tools. The method grows a complex image in steps. Starting with an initial template consisting of a number of components, the template is transformed by replacing one component by a transformed version of the same or another template. The replaced component is colorized. The colorization is a function of the original color of the component and the color path associated with the replacement template. These steps are repeated until the drawing is sufficiently detailed. An embodiment on a digital computer can do millions of steps, resulting in stylized natural and geometrical images of great detail and complexity.

14 Claims, 8 Drawing Sheets
(4 of 8 Drawing(s) Filed in Color)

DESIGNATING, DRAWING AND COLORIZING GENERATED IMAGES BY COMPUTER

BACKGROUND—FIELD OF INVENTION

This invention relates to graphic design, specifically to the creation and colorization of a large class of arbitrarily complex images with very little user-inputted data.

BACKGROUND—DISCUSSION OF PRIOR ART

A method introduced by Benoit Mandelbrot to generate black & white fractals is described in his books "Fractals: Form, Chance and Dimension" and "The Fractal Geometry of Nature" (1977 & 1982, W. H. Freeman, publisher). Mandelbrot's method specifies how to draw a class of complex geometric shapes, called linear fractals, using what he calls generators. The template concept used in the present invention is a generalization of Mandelbrot's generators. There are at least five limitations of Mandelbrot's method: it is limited to black & white fractals; the fractals are exactly self-similar (that is, they consist of smaller copies of themselves); the template consists of straight line segments; the fractals are defined by exactly one template; and the fractals are drawn according to fixed recursive replacement (defined in Section 4 of Description of Invention). The present invention has none of these limitations. The present invention can create colored images that do not have to be self-similar, they can have more than one template, the templates do not have to consist of straight line segments, and drawing can be by other means than fixed recursive replacement (for example, by random threshold replacement).

The software program FractaSketch 1.0, developed by the inventor and first marketed in 1988 (Dynamic Software, software publisher) is a tool to draw images according to Mandelbrot's method. Version 1.0 has the limitations of Mandelbrot's method. Furthermore, version 1.0 has a much narrower scope than the disclosed embodiment of the present invention. Version 1.0 is not a graphic design tool, but was intended to explore fractal geometry, which is of interest primarily to students and mathematicians. Version 1.0 did not use the colorization process of the present invention.

Many books about fractals and collections of fractal images have been published. A typical technical book is "Chaos and Fractals", by Heinz-Otto Peitgen, Hartmut Jürgens, and Dietmar Saupe (1992, Springer-Verlag, publisher). A typical collection is "Fractals: The Patterns of Chaos", by John Briggs (1992, Simon & Schuster, publisher). These books give several techniques to draw and color a class of images called non-linear fractals. Common examples are the Mandelbrot set (also owing to Mandelbrot but unrelated to his method explained above) and Julia sets. The drawing is based on a mathematical equation that is used to calculate each point of the image. Since there is no obvious connection between the equation and the drawing, therefore these techniques are highly limited as design tools. The colorization naively follows a given spectrum. It is impossible other than by trial and error to direct the drawing or the colorization to achieve a desired effect.

Current graphic design tools (such as MacDraw II™, Illustrator™, Freehand™, Photoshop™, and other computer-aided design tools) do not allow easy creation of highly complex colored geometric shapes. They are best used for the creation of simple images, or for the modification or transformation of complex images. It is difficult or impossible to create complex colored images that are so complex that it would be impractical to draw them by hand. To create such a complex image one must draw its components manually, which becomes impractical when there are thousands or millions of components.

There exist software programs that allow one to create complex images. Typical applications include Color Expansions™ (by John Stokes, Pixel Pathways), Symmetry™ (by Timothy Binkley, School of Visual Arts, NY), and Rep-Tiles™ (by Daniel H. Huson and Olaf Delgado Friedrichs, Universität Bielefeld, Germany). A disadvantage of these tools is that it is not possible to create images with detail at all scales of length. A second disadvantage is that the colorization consists in manually picking colors for each part of the drawing, and hence lacks detailed gradations of color. A third disadvantage is that the tools cannot create images that look like natural objects. The tools are limited to creating particular classes of geometric designs, and hence have narrow applicability. Natural objects are rarely purely geometric designs and they often have detail at all scales of length. The present invention has none of these disadvantages.

There exist applications based on fractal geometry that allow the creation of complex images. These applications are not suitable for graphic design because they allow only the inspection of existing fractals. They do not provide control for the graphic designer. Typical applications include MandelMovie™ (by Michael Larsen, University of Pennsylvania), which is based on the Mandelbrot set, and FractInt™ (by the Stone Soup Group). These applications do not allow color gradations to be themselves gradated (giving variations at all scales of length), such as is described in the present invention. Furthermore, to do useful work these applications require the user to enter mathematical equations or numbers. As a result, the designer not versed in these mathematical constructs has almost no way to make a desired image. The present invention has neither of these disadvantages.

A method introduced by Michael Barnsley to generate black & white fractals is described in his book "Fractals Everywhere" (1988, Academic Press, publisher). Barnsley's method is called IFS (Iterated Function Systems). The method describes how to create a class of linear fractals called self-affine (a generalization of self-similar which allows linear stretching of the copies). Barnsley has patented variations of the IFS method for image compression and decompression (U.S. Pat. Nos. 5,430,812, 5,384,867, 5,347, 600, 5,065,447, 4,941,193), all of which are outside the scope of the present invention. The IFS method can also be used for design. Typical applications based on IFS include Fractal Design Studio™ (by Terri Koyn) and IFS:Fractus™ (by Eric "Doc" Kampman). There are at least four limitations of the IFS method for design: it is limited to black & white fractals or primitive colorization schemes; the fractals are exactly self-affine; control over an image's complexity and texture is weak; and the drawing process is limited in a way described in the next paragraph. The present invention has none of these limitations. The present invention can create subtly-colored images that do not have to be self-affine, the graphic designer has full control over image complexity and texture, and the drawing and colorization processes are highly flexible and efficient.

All IFS programs or articles known to the inventor use one of two drawing processes: pixel-based drawing (which generates one pixel at a time) or fixed recursive replacement. Pixel-based drawing is slow and is only useful for drawing the limit fractal (i.e., the most detailed one possible with a given template). Fixed recursive replacement lets one draw intermediate fractals as well, but only a limited number of them (indexed by the recursion depth). Both processes therefore give very little control over the shape's complexity and texture. To the best of the inventor's knowledge, there is no published generalization of recursive replacement that provides the power of the choice function technique described in the present invention. The choice function technique gives direct and fine control over the amount of detail in every part of the drawing.

A review of the prior art has not turned up a method to automatically colorize a self-similar image. This is unfortunate since self-similar images are found in nature (e.g., trees, ferns, clouds, shorelines). Furthermore, experience shows that it is much easier to design with self-similar images (such as linear fractals) than with images that are not necessarily self-similar (such as non-linear fractals). Non-linear fractals are created in an exploratory, haphazard way: one is never sure what the image will look like. On the other hand, linear fractals provide a sure and direct control over the finished image. The present invention shows how to draw and colorize "generated images" (a class of images that is defined below), which are a powerful extension of self-similar images.

OBJECTS AND ADVANTAGES

Several objects and advantages of the present invention are presented by the following.

It is one object to give the graphic designer full control over the creation of a large class of complex images, called generated images. This control lets the designer create and edit in a simple way images containing thousands to millions or more of individual components. No known previous technique gives the designer the leverage that the present invention provides.

It is another object to give the graphic designer full control over the colorization of generated images. No known technique lets the designer do subtle and interesting colorization of complex images. The present invention lets the designer colorize images that are impractical to colorize by hand.

It is still another object to show how arbitrarily complex shapes can be drawn and colorized with very little user input. The present invention shows how detailed and subtly-colored complex images can be created with very little effort on the part of the designer.

It is also an object to show how to draw in a simple way complex colored images that are reminiscent of natural images. Natural images are colored and have much detail. Previous inventions either only draw black & white images of a restricted type or they do not allow the drawing of images with much detail.

It is yet another object to give the designer control by direct manipulation. This control over the drawing process is simple and intuitive. The designer never has to enter an equation. The effects of the designer's manipulations are immediately visible.

It is still one more object to show how the creation of complex colored graphical images can be separated into two independent tasks: (1) drawing of the shape, and (2) colorization of the shape.

Finally, it is one object to show how self-similar shapes can be colorized in a way that is simple and that follows the self-similar structure of the shape.

Further objects and advantages of the invention will become apparent from a consideration of the drawings and their accompanying description. For example, the invention lends itself to an efficient implementation on a digital computer. Another advantage is that the control over the drawing and colorization processes can be given by a series of defaults that can be overridden by the designer. The defaults yield quite satisfactory results in many cases.

SUMMARY

A technique for designing and drawing a class of highly complex and subtly-colored natural-looking or geometric images with a small amount of user-inputted data, giving the graphic designer full control in the creation of images that are so complex that creating them manually is impractical. The creation and modification of the images is done by direct manipulation. The image is created by a drawing process and a colorization process, both typically implemented in a software program. The drawing process starts by drawing a template of a generated image. Then a component of the drawing is chosen and replaced by a transformed copy of a replacement template. This replacement step is iterated until the drawing is satisfactory. The decision to stop the iteration is made by a choice function that chooses the replacement template during each replacement step. The colorization process colorizes the transformed copy in each replacement step, according to a color path associated with the template and a mixing function that tells how to combine the color path with the color of the replaced component.

DESCRIPTION OF DRAWINGS

The file of this patent contains at least one drawing executed in color. Copies of this patent with color drawings will be provided by the Patent and Trademark Office upon request and payment of the necessary fee.

DESCRIPTION OF INVENTION

1. Introduction, overview, and terminology

The present invention comprises a method for drawing and colorizing generated images, a class of images that are often so complicated that they are impractical to draw with existing drawing tools. The method results in color variations at all length scales of the images. The colorization can be quite detailed and subtle, and the result can be made to resemble a natural object such as a plant or a landscape. A graphic designer using the method needs to give very little input to determine the shape and colorization at any level of detail. Furthermore, the designer has full control over the shape and the colorization.

The following terminology is used throughout. An image is any pictorial representation, complex or simple, natural or artificial. An image consists of two parts: its shape and its colorization. An image may be colored. The shape is what a black&white camera would see if it did not have shades of gray, that is, all differences in color and brightness are disregarded. The colorization is what is added to the shape to give the image. A generated image is an image that consists of copies (exact, approximate, simplified, or deformed) of itself or of other generated images. A generated shape is a shape that consists of copies (exact, approximate, simplified, or deformed) of itself or of other generated shapes. A template is a blueprint for a generated image that describes how the image is composed of copies of itself or other generated images. These copies are called components of the template. In addition to a set of components, a template contains a base line giving the template's size and orientation. A color path is a blueprint that describes how the template is colored. It defines a separate color for each component of the template.

The following additional definitions are related to the user interface that is seen by the designer in an embodiment on a digital computer. A user interface is the common language used to communicate between a user and a computer system. The term "language" is used here in the broadest sense, i.e., it may imply the use of any subsystem designed to interact with the user (e.g., mouse, keyboard, screen, audio, video, etc.) as well as text. A user-interface tool is any well-defined procedure using elements of a given user interface to introduce particular kinds of information into the system. For example, moving the mouse to define a line segment. If the procedure requires no knowledge of the information's internal representation then it is said to introduce the information by direct manipulation. The internal representation is typically based on numbers or equations which have no intuitive relation to the graphic representation. One reason that direct manipulation is more intuitive is because it is more visual. For example, in the FractaSketch embodiment of the present invention (described below), a component of a template is entered by moving the mouse to draw the component and clicking when the desired component is shown.

Generated images, as defined above, are closely related to fractals. The two concepts overlap: many generated images are fractals, and many fractals are generated images. The two concepts are different however: a fractal always has infinite detail, whereas a generated image can have any amount of detail, finite or infinite. A generated image with infinite detail can of course only be approximately drawn. A fractal is a mathematical concept, whereas a generated image is a practical concept that can easily be drawn. Therefore, for the purposes of graphic design, a generated image is a more useful concept than a fractal.

The present invention is illustrated in FIGS. 1–9 with a linear fractal on a two-dimensional surface as example of a generated image. A linear fractal consists of exact copies of itself. However, the technique applies to any generated image in a space of any number of dimensions. The example of a linear fractal on a surface is chosen to simplify the illustrations. This choice should not be construed as limiting the scope of the present invention in any way.

Creating and colorizing an image is done by two independent but related processes. The drawing process determines the shape of the image in all detail (but without color), and the colorization process gives the shape its color. The two processes work as follows:

(i) The drawing process. Create a shape by first drawing its template. Then, transform the template in successive replacement steps that result in a detailed shape.

(ii) The colorization process. The shape is colorized by giving a color path to each of its templates. At each replacement step, the color of the drawing is transformed using the color paths.

A color path gives a sequence of colors that a template will traverse. However, the final image does more than just uniformly traverse the colors of a color path. The present invention can depict such a uniform gradation of colors, but it is not limited to a gradation. An important novelty of the present invention is that there are color variations on all scales of length. This subtle colorization offered by the present invention is what makes the resulting images strikingly natural.

The drawing process and the colorization process are independent of each other. It is in part this separation of concerns (shape and color) that gives the design technique presented herein its power. Given a shape, the designer is able to colorize it independently, confident that the colorization will be intimately related to the shape. Given a colorization, the designer is able to change the shape, confident that the image will retain the colorization.

The invention description is structured as follows. First, sections 2 and 3 present the drawing and colorization processes in detail. This is followed by explanations of the choice function and mixing function in sections 4 and 5. The choice function determines the texture of the final shape and how much detail it will have. The mixing function determines how the shape will be colored. Section 6 summarizes how to draw and colorize a shape. Finally, section 7 gives two embodiments of the present invention as software processes for a computer.

2. The drawing process: Creation of the shape

Figure 1:
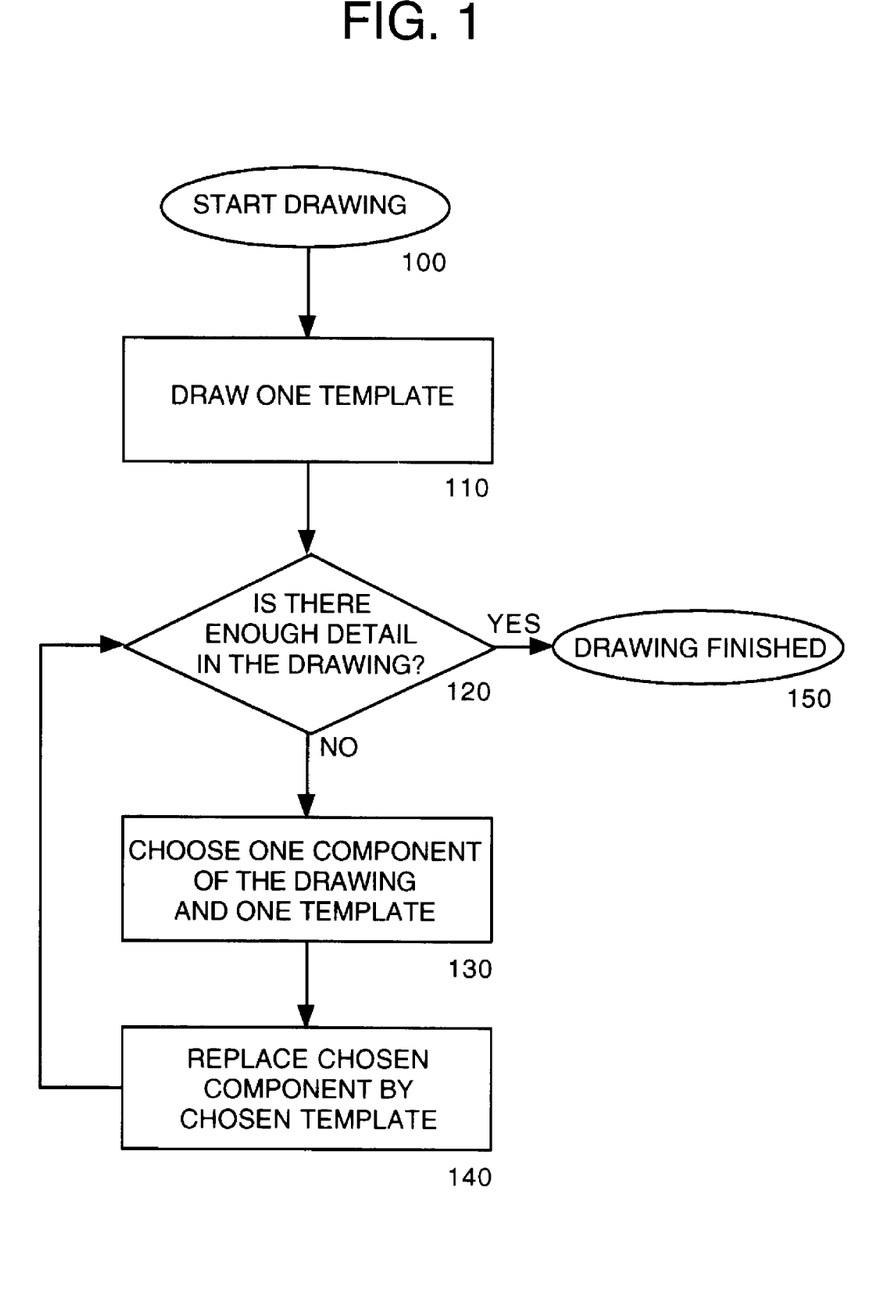
FIG. 1 is a flowchart of the drawing process.
Figure 3:
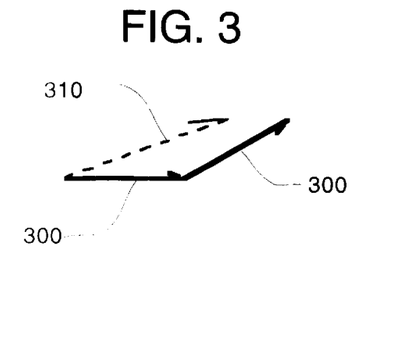
FIG. 3 shows an example template that is used to create a generated shape.
Figure 4:
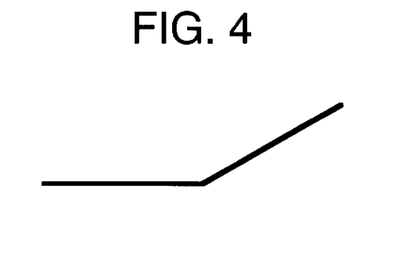
FIG. 4 shows the initial step of the drawing process applied to the template of FIG. 3.

The drawing process is defined in the flowchart of FIG. 1. The operation of the flowchart is illustrated by using FIGS. 3–6 as an example. FIG. 3 shows a template comprising two line segments (300) and a base line (310). The base line (310) gives the size and orientation of the template. The two line segments (300) are the components of the template. In the example, the template consists of straight line segments because this makes the drawing process very easy to illustrate. This should not be construed as a limitation on the invention—the template could just as easily consist of curved lines, surfaces in three dimensions, or arbitrary shapes. Given the template, the shape is drawn in successive steps starting at block 100 by the process of FIG. 1:

(i) First, draw the template, represented by block 110. FIG. 4 shows the result of drawing the template of FIG. 3. The result is identical in shape to the template itself. In general, when a template is drawn, its components are given some pictorial representation. Typically, a component is drawn as a line segment, a curve, an area, or an imported picture.

Figure 5:
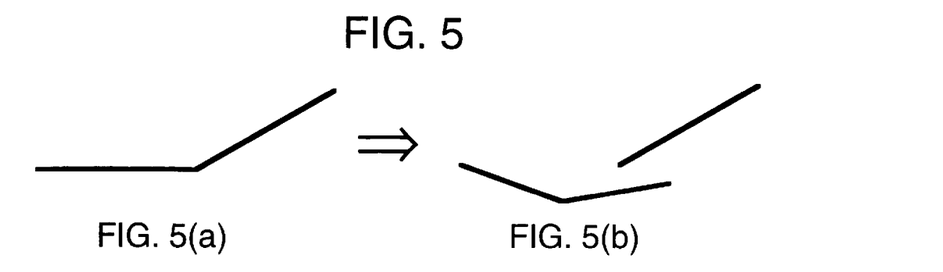
FIGS. 5(a)–5(b) show the first iterative step of the drawing process (that is, a single replacement step) applied to the template of FIG. 3.

(ii) Second, choose a component of the drawing, represented by block 130, and replace it by a properly-oriented and possibly deformed or transformed copy of one of the shape's templates, represented by block 140. Because the example has only one template, it is chosen to replace the component. The copy is oriented and resized so that its base line (310) fits exactly on the component (300). The copy can additionally be deformed or transformed. Choosing a component and replacement template is called a choice step and replacing a component is called a replacement step. FIGS. 5(*a*)–(*b*) show the result of replacing the leftmost line segment of the template by a reduced copy of the whole template.

Figure 6:
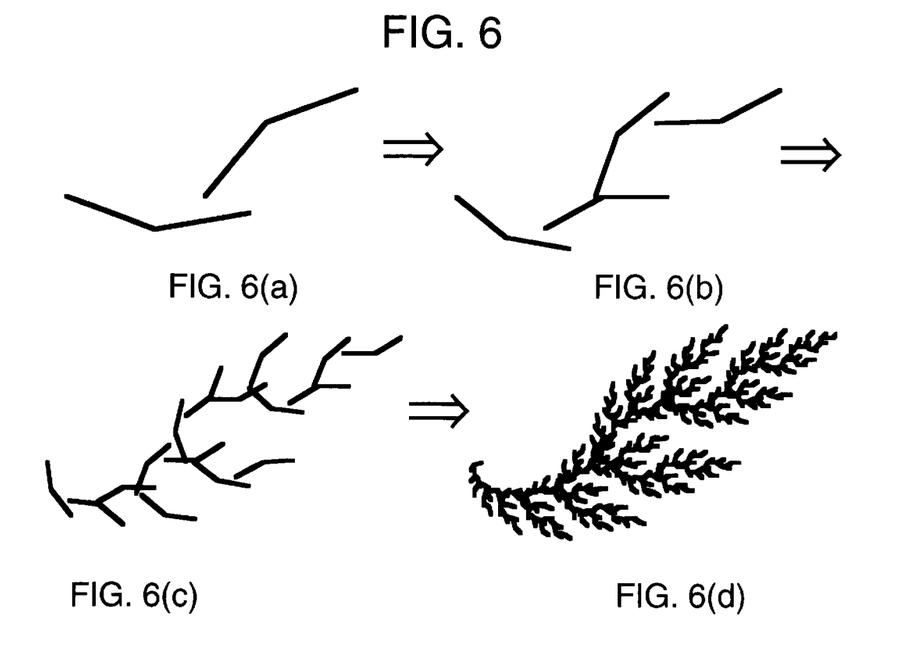
FIGS. 6(a)–6(d) show several generated shapes at different levels of detail, drawn with the drawing process applied to the template of FIG. 3 using recursive replacement.

(iii) Third, keep choosing components and replacement templates, and doing replacement steps until reaching the desired level of detail in the image. The decision to continue is represented by block 120, with a decision to terminate being taken represented by end block 150. FIGS. 6(*a*)–(*d*) show several images at different levels of detail. These images are obtained with different numbers of replacement steps.

The fact that the example of FIGS. 3–6 is exactly self-similar should not be construed as limiting the scope of the present invention to exactly self-similar shapes. It is a trivial matter for the replacement step to deform or transform the template. This results in a shape that is not exactly self-similar. The drawing and colorization processes continue to apply. Four parameters that have been found suitable for the deformation or transformation applied at a replacement step are:

(i) The replaced component itself. For example, the deformation can become larger as the replaced component's size becomes smaller. Additionally, the replaced component can carry data with it that describes its deformation, and this data can be used in further replacement steps.

(ii) Some or all of the previous replacement steps. Any information gathered during the previous replacement steps can be used to modify the deformation. For example, the deformation can become smaller as the number of previous replacement steps increases. A second example is to replace the component by an imported picture when the number of replacement steps or the recursion depth increases beyond a given threshold.

(iii) The other components of the drawing at the moment of the replacement step. For example, the replaced component can be deformed so that it fits exactly with the two components adjacent to it. If the components are straight line segments, then this deformation makes them into curves.

(iv) Any parameters introduced to modify the deformation or transformation. For example, there can be one global parameter to indicate the strength of the deformation. When it is zero, there is no deformation.

3. The colorization process: Colorization of the shape

Figure 2:
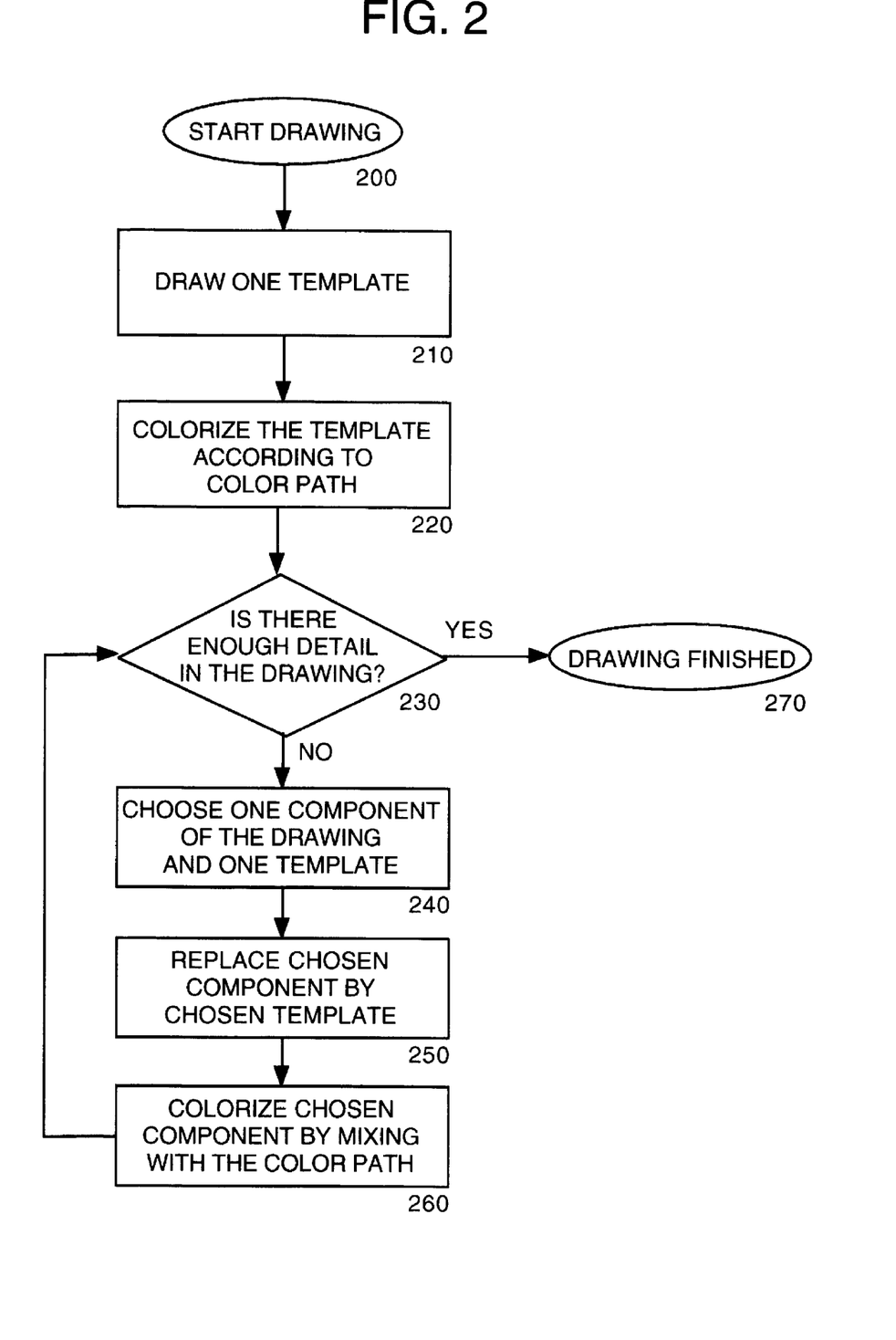
FIG. 2 is a flowchart of the colonization process.
Figure 7:
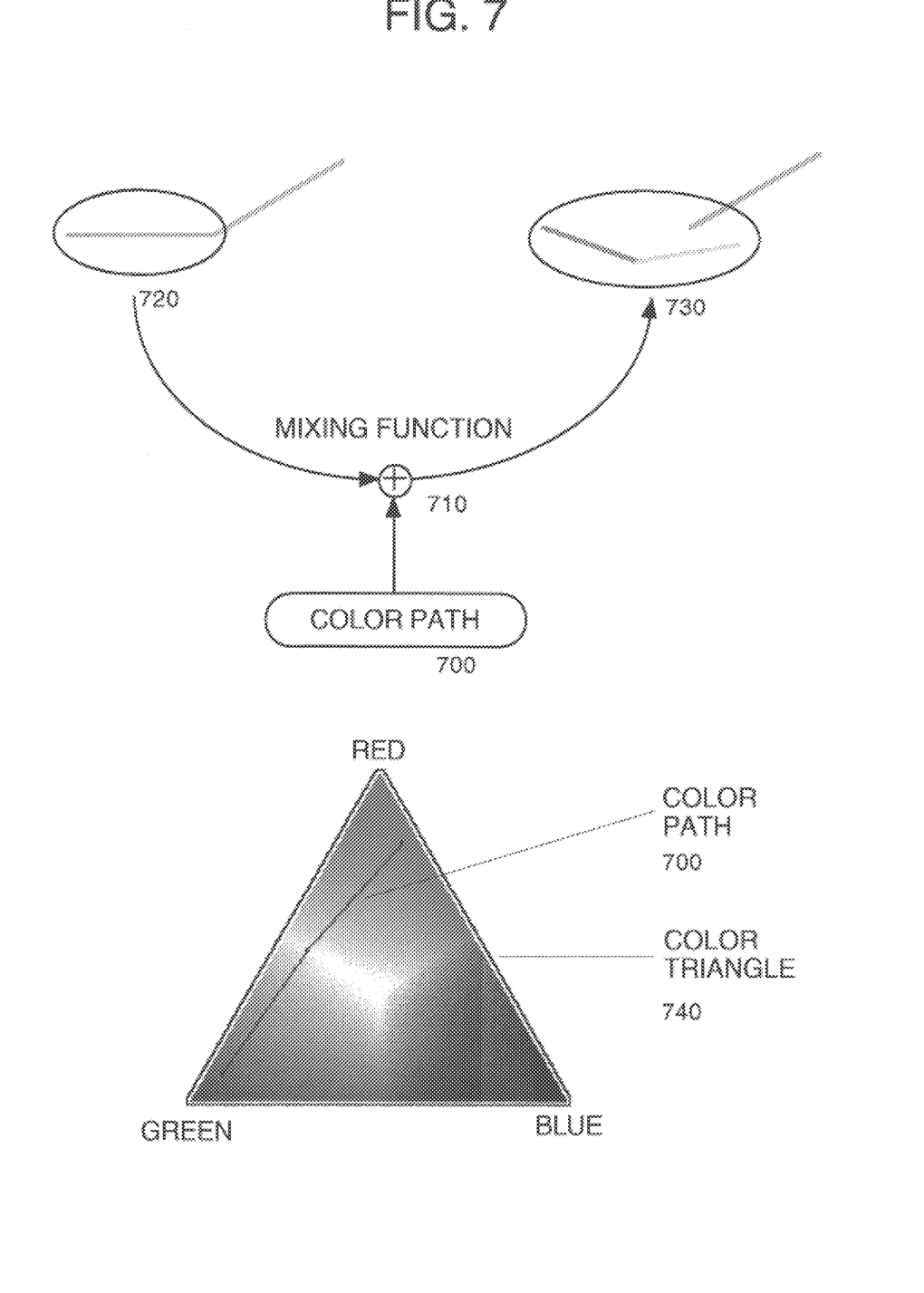
FIG. 7 shows the first iterative step of the colorization process, using a mixing function and the template of FIG. 3.
Figures 8, 8A, 8B:
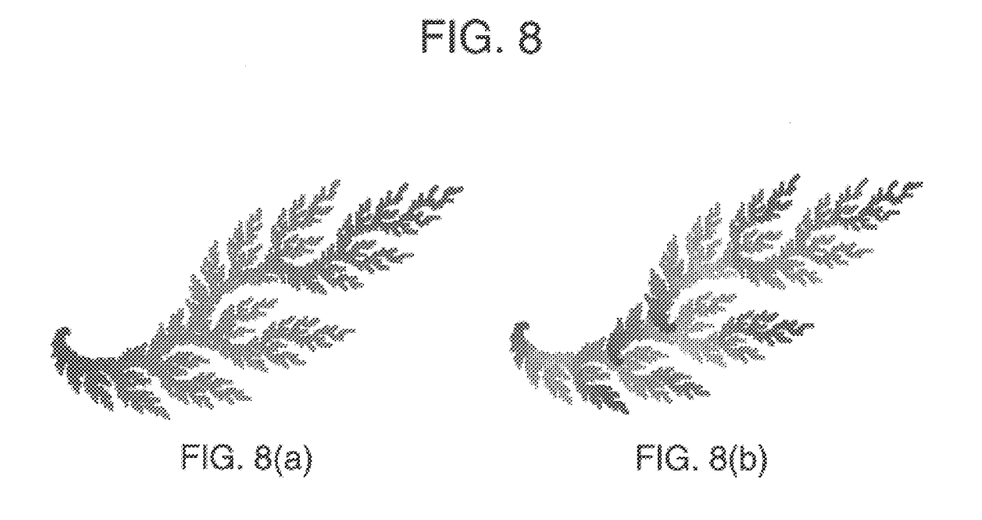
FIGS. 8(a)–8(b) show several generated images with different mixing functions, that were colorized using the color path of FIG. 7.

The colorization process is defined in the flowchart of FIG. 2. It extends the drawing process. The colorization process is illustrated in FIGS. 7–8 by colorizing the example of FIG. 3. Given a color path for the template, the shape is drawn and colorized in successive steps starting at block 200 by the process of FIG. 2:

(i) First, draw the template, represented by block 210, and color it according to the color path, represented by block 220. FIG. 7 (block 740) gives a typical color path shown inside of a color triangle. The color path of FIG. 7 (block 700) goes from green to yellow to red.

(ii) Second, choose a component of the drawing, represented by block 240, and replace it by a copy of a chosen template, represented by block 250. Colorize the resulting copy by combining (i.e., mixing) the color of the component and the colors of the template's color path, represented by block 260. This step is called a mixing step. FIG. 7 illustrates a replacement step with color mixing. FIG. 7 is explained in detail below.

(iii) Third, keep choosing components and templates, and doing replacement and mixing steps until reaching the desired level of detail in the image. The decision to continue is represented by block 230, with a decision to terminate being taken represented by end block 270. FIG. 8 shows several images so obtained with different mixing functions.

4. The choice function

The choice step in the drawing process (block 130 in FIG. 1) requires first choosing which component to replace and then which template to replace it by. Both of these choices are given by the choice function. The drawing process stops when the choice function gives no more choices. The choices made will affect the detail and the texture of the drawing. Many useful choice functions are possible. For example, a choice function can incorporate randomness as a way to increase a natural appearance. Three suitable first parts of a choice function (for choosing which component to replace) are:

(i) Recursive replacement. First, replace all components of the template once. When this is done, then replace all resulting components once. Continue replacing in this layered way until the desired detail is attained. Recursive replacement can be implemented easily by a recursive algorithm that draws a given number of layers. Recursive replacement is controlled by a single number: the number of layers, which is also called the recursion depth or level of the shape.

(ii) Recursive replacement with deltas. Recursive replacement can be generalized to allow adjusting the recursion depth on a per-component basis. Each component is given an integer parameter, delta, which is added to the recursion depth for that component. The default value for the deltas is zero, which gives ordinary recursive replacement. Recursive replacement with deltas gives control over the complexity and texture of any part of the shape, which is not possible with standard recursive replacement.

(iii) Threshold replacement. Pick a component that is bigger than a threshold size and replace it. Continue until all components are smaller than the threshold. Threshold replacement is controlled by a single number: the threshold size.

Two suitable second parts of a choice function (for choosing which template to replace the component by) are:

(i) Fixed replacement. A component of a template is marked with the template to replace it by. Whenever this component is replaced, the template designated by the mark is chosen. A suitable default is to replace the component by a copy of the template it belongs to.

(ii) Random replacement. A component of a template is marked with a set of templates to replace it by. Each template in the set is annotated with a probability. Whenever the component is replaced, a random choice is made among the designated set of templates, such that each member of the set is selected with its probability.

The first and second parts of the choice function are picked independently of each other. For example, the choice function may do fixed recursive replacement, or random threshold replacement. Many other choice functions are possible than shown here. The present examples should not be construed as limiting the power of the concept of choice function.

If the drawing process is implemented on a computer, then achieving any given level of detail requires the same effort from the designer. He or she has only to pick the right choice function. Picking the choice function determines how detailed the final drawing will be. Drawings with lots of detail need a very large number of choice steps (thousands to millions or more). The most interesting drawings tend to be the most detailed ones.

5. The mixing function

The mixing step in the colorization process (block 260 in FIG. 2) is shown in detail in FIG. 7. It requires mixing the colors of the chosen component and its color path. In FIG. 7, the mixing is given by the mixing function. (710). During the replacement step, an input component (720) is mixed (710) with a color path (700), giving a colorized output template (730). One way to show the color path is on a color triangle (740). It is necessary to choose an appropriate mixing function for a given sought-after appearance. The main input to the mixing function is the color path (700).

Figure 9:
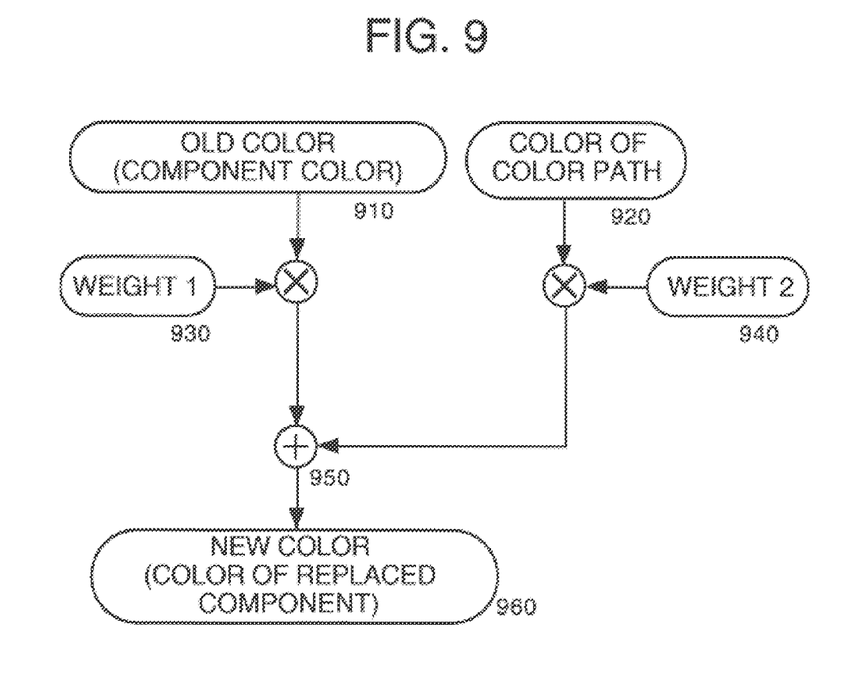
FIG. 9 shows a typical mixing function.

The mixing function used in the example of FIGS. 3–8 is a weighted arithmetic average of the colors of the line segment with the color path. The function calculates a color for each point of the template. FIG. 9 gives a block diagram of this mixing function. The function uses a numeric representation of the colors. In one embodiment, the mixing function assumes that colors are represented as triples (R,G, B) giving the amount of red, green, and blue. The function has two color inputs, the old color (910) and the color of the color path (920). These colors are respectively weighted (e.g., multiplied by a weight number) by weights (930 and 940) and then averaged (950). The result (960) is the color of the replaced component. The weights are determined as additional parameters to the function. One way to obtain natural effects is to decrease the weight of the color path as the drawing becomes more detailed. Typically, this will be done by using one or both of the following parameters to calculate the weights:

(i) A first parameter to indicate how far the drawing has progressed. For example, it can be the number of replacement steps used to generate the component. If this number is large then the drawing is nearing completion, so the weight of the color path is decreased.

(ii) A second parameter that gives the size of the component. If the size is small, then the weight of the color path is decreased.

Many other mixing functions are possible. For example, the FractaSketch embodiment (described in section 7 below) introduces five parameters, called Brightness, Contrast, Repetition, Depth, and Interpolation Type. To give the graphic designer the most control, the mixing function should depend on a small number of parameters, and these parameters should have direct and clear influence on the drawing.

6. Summary of the drawing and colorization processes

We have now explained the drawing process, the colorization process, and given typical examples of a template, a choice function, a color path and a mixing function. The flowcharts of FIG. 1 and FIG. 2 explain the processes. The flowcharts are presented in the most general possible way.

To summarize, making a drawing requires four inputs. Two inputs define the shape of the image by the drawing process:

(i) The templates. Together, these give the structure of the generated shape.

(ii) The choice function. It tells how to use the templates to draw the shape. This function defines the shape's texture and amount of detail.

Two further inputs define the color of the image by the colorization process:

(iii) The color paths (one for each template). A color path gives a color for each component of the template.

(iv) The mixing function. It tells how a color path is merged with the color of an image's component.

Embodiments of the two processes will typically provide defaults for these four inputs. The designer can then ignore one or more inputs, making the present invention easier to use. However, the designer has complete control over the shape and color by overriding the defaults.

The resulting shape can be a complex image with many subtle color effects. FIG. 8 shows some typical results of the colorization process. Yet, very little user input is needed to create the colorization: just the color path and the mixing function. Since very little input is needed, the designer can quickly create and modify the design. The designer has full control by slightly varying the input. For example, dragging a point in the color path towards the red corner of the color triangle introduces more red in the drawing.

7. The principal embodiments

One, but by no means exclusive, embodiment envisaged for the present invention is as the heart of the software product FractaSketch™ 2.0, a professional graphic design tool for personal computers which is currently under development. This embodiment allows fast interactive creation and colorization of generated images. This embodiment is intended to complement existing design tools (such as Illustrator™, Freehand™, Photoshop™, Kai's Power Tools™, etc.).

In this embodiment, the user can open any number of windows on the screen, limited only by available memory. Each window contains a template, a choice function, a color path and a mixing function. The window either shows the template or draws the generated image using its choice and mixing functions. A window's content can be modified (i.e., edited). The windows whose templates and color paths are needed to draw a given image are said to be linked to that image's window. Modifying a window's template or color path will redraw all windows that the window is linked to. This gives immediate on-screen feedback of the modification's effect, which makes the design process very efficient. The embodiment uses a standard algorithm for transitive closure to determine which windows the modified window links to.

In this embodiment, all four inputs (templates, choice functions, color paths and mixing functions) are entered and modified by direct manipulation. To be precise, the inputs are entered by giving graphical information that corresponds closely to their meaning in the drawing or colorization process. For example, to enter the color path, the points on the color path are dragged to the desired hue, value and intensity. The mixing function of this embodiment is an arithmetic average that is modified by five parameters called Brightness, Contrast, Repetition, Depth, and Interpolation Type. Brightness and Contrast modify global aspects of the drawing in an obvious way. Repetition indicates how often the color path is traversed during the drawing of a template. Depth indicates how much the deeper levels influence the color. Interpolation Type indicates how the color path is mapped onto the components of the template. Experience shows that all five parameters are useful for a practical design tool.

Figure 10:
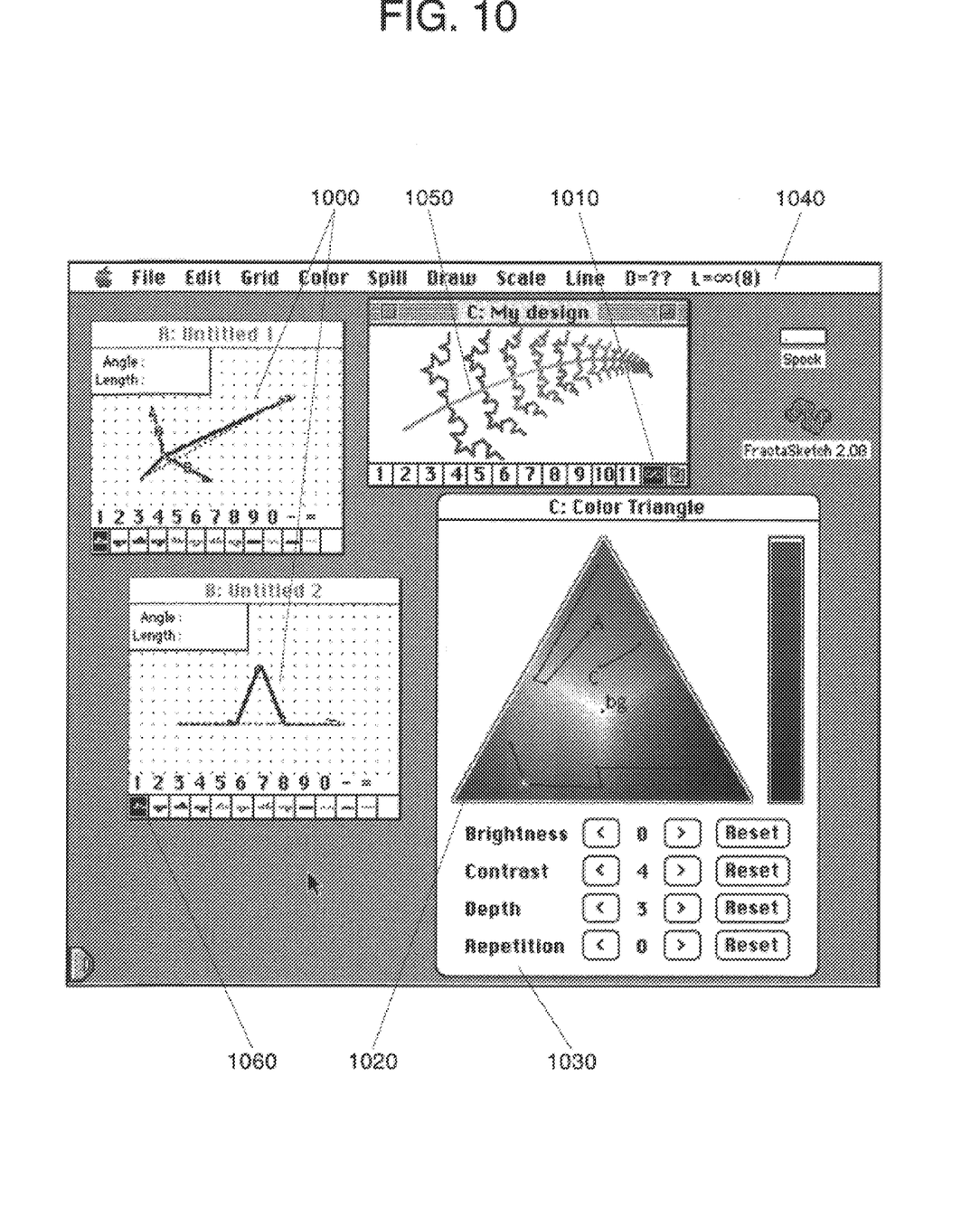
FIG. 10 shows a screen snapshot of the FractaSketch embodiment of the present invention.

FIG. 10 shows a screen snapshot of this embodiment. This snapshot was taken on an Apple Macintosh™ computer. Since it is straightforward to implement the embodiment on any system, this snapshot should not be construed as limiting the invention to any particular make of system. The snapshot shows a drawing defined with three templates, marked A, B, C in the window titles and on the color triangle. The snapshot shows in window "C: My design" a colored image resembling a fern (1050) with two of its templates in windows A and B (1000), its choice function (1010), its color paths (1020) and its mixing function parameters (1030). The templates, color paths, choice function, and parameters can be edited interactively, with immediate feedback on the image. The user has graphical tools (1060) to create and edit the templates (1000) and color paths (1020) by direct manipulation. The choice function (1010) of window "C: My design" is fixed threshold replacement with a threshold of 8 pixels. This is marked by the symbol "∞" in window "C: My design" (1010) and by "L=∞(8)" in the menu bar (1040). Other choice functions are available, for example recursive replacement with deltas. The color paths are defined inside a color triangle. Further parameters for the choice function and mixing function are available in the menus (1040) and through keyboard commands.

Figure 11:
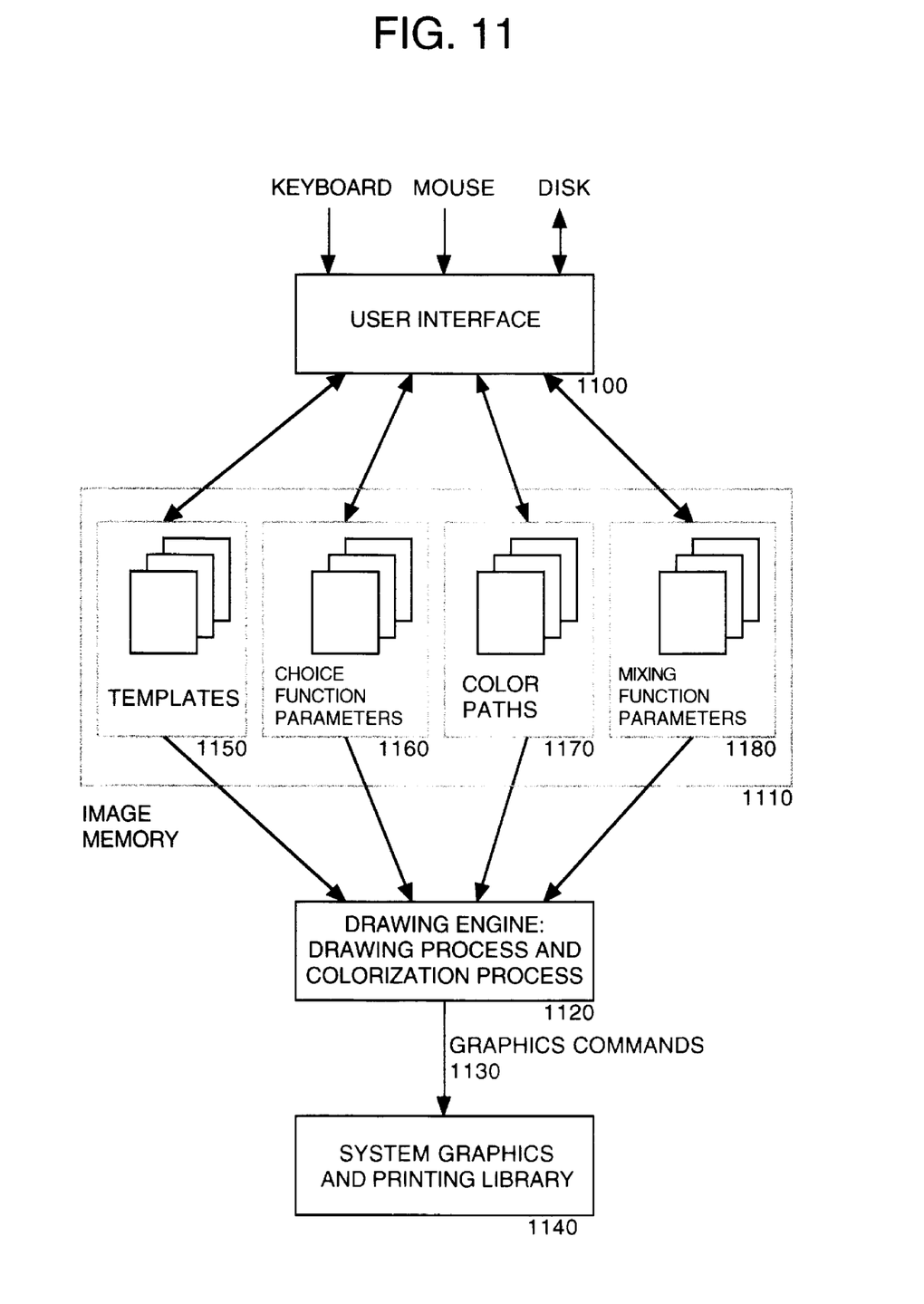
FIG. 11 shows the internal structure of the FractaSketch embodiment of the present invention.

FIG. 11 shows the internal structure of this embodiment. The user defines the templates, choice functions, color paths and mixing functions by direct manipulation with user-interface tools using the keyboard and mouse (1100). This information may be stored and retrieved from permanent storage (e.g., disk). The internal data of the program is stored in the image memory (1110). This memory contains at least the templates (1150), choice functions (1160), color paths (1170) and mixing functions (1180). The drawing engine (1120) implements the drawing and colorization processes, and sends a series of graphics commands (1130) to the system's built-in graphics/printing library Quickdraw™ (1140). The graphics commands in this embodiment include: draw line segment, set pen thickness, set pen color, and select window.

For efficiency reasons, this embodiment treats specially those templates in which the components are straight line segments. For these templates, it uses fixed-point arithmetic to perform the calculations necessary to draw and colorize the image. An optimized turtlegraphics package developed by the author is used to calculate the positions of the image components. The package avoids calculating the positions of image components that are not visible in the output. Optimized routines for finding the sine and cosine of an angle (based on table lookup and interpolation) and fixed-point multiplication and exponentiation are included.

A second embodiment of the present invention is as the basis of a plug-in module to an existing software package. For example, a drawing tool based on the principles of the present invention can be a plug-in module to a popular design environment such as Freehand™ or Illustrator™. It should be well-understood by one of ordinary skill in the art how to create and interface such a plug-in module to these drawing tools.

Other embodiments are possible. In particular, the present invention can be implemented in a straightforward way as a mechanical, electronic, or manual process requiring the creation and colorization of complex images.

OPERATION OF INVENTION

Figure 12:
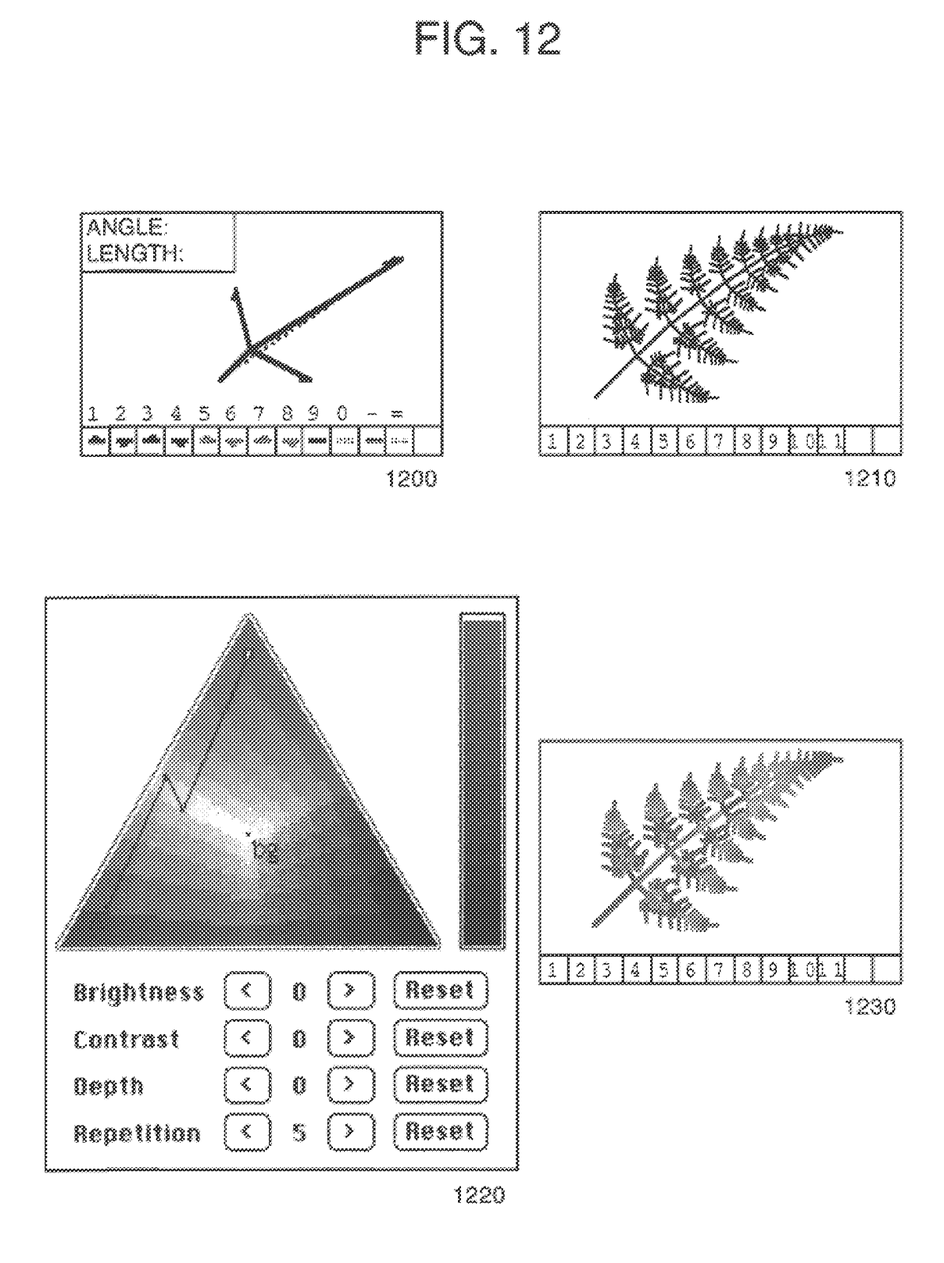
FIG. 12 shows the operation of the FractaSketch embodiment of the present invention from the user's point of view.

To illustrate the operation of the present invention, FIG. 12 shows how to use the FractaSketch embodiment to design and colorize a shape resembling a fern. FIG. 12 shows the steps involved in the creation of an image (1200, 1210, 1220) and the resulting image (1230). The shape and colorization of the image are designed separately. First design the shape:

(i) Draw the templates (1200). Typically, but not always, the templates will be skeleton figures of parts of the final shape. In the case of a fern, only one template is needed. The template consists of three components: a central branch with two side branches. The template is defined by moving the mouse and clicking for each component.

(ii) Pick a choice function. For example, choosing fixed threshold replacement to a size of 8 pixels on the screen results in a fern shape (1210) appearing on the screen. The choice function is given with a menu, keyboard, or mouse command.

Now colorize the shape:

(iii) Draw a color path for the template. The color path is drawn inside the color triangle (1220) by dragging points which correspond to components of the template. As an example, let us color the fern with autumn colors. The central branch is green and the side branches start green and end up red.

(iv) Pick the mixing function. The default mixing function can be modified by the four parameters below the color triangle (1220). The default mixing function is an average. The average is based on the size of the component. That is, smaller components have less influence on the resulting color. Therefore, small parts of the drawing will have almost the same color, and large parts can have very different colors. The colorization is not at all uniform—there are variations at all sizes. The result is a stylized, natural-looking image.

After these two manipulations, a colorized fern appears on the screen (1230). If the fern is not satisfactory, it can be edited by direct manipulation. The shape and the color are edited separately. The shape is edited by changing the template or changing the choice function. For example, the threshold of 8 pixels can be increased to 10 pixels. This results in a less dense fern. The color is edited by changing the color path or changing the mixing function. For example, the effect of smaller components on the color can be increased by increasing the Depth parameter. This results in a fern with more color variations.

From the foregoing, one can see that the above processes of drawing and colorizing a generated image are powerful and general. The graphic designer has full control over the creation of stylized geometric and natural forms. The generated images are created and modified by graphical means through direct manipulation. The shape and color of the image are designed independently. It is possible to create detailed images with fine color gradations in a simple way.

I claim:

1. A method to draw a generated shape comprising:
   (a) drawing a template of said generated shape;
   (b) choosing a component of the drawing and a replacement template, both according to a predetermined choice function, where said choice function is used substantially to provide fine control over complexity, density, and texture of said drawing;
   (c) replacing said component by a transformed copy of said replacement template; and
   (d) repeating steps (b) and (c), together referred to as an iteration, until no further components are given by said choice function.

2. The method of claim 1 extended to draw a generated image and to that end further comprising:
   (a) choosing a color path for each template in said image; and
   (b) during each said iteration, combining the color of said component with the color path that corresponds to said replacement template, using a predetermined mixing function.

3. The method of claim 2 wherein said transformed copy represents one or more of a scaling, rotation, deformation, and simplification of said replacement template.

4. The method of claim 2 wherein each template includes a set of components that are line segments.

5. The method of claim 2 wherein the first part of said choice function is selected from the group consisting of recursive replacement with deltas and threshold replacement.

6. The method of claim 2 wherein said mixing function is a weighted arithmetic average of the color of said component with the color path of said replacement template.

7. The method of claim 2 wherein said image is defined by more than one template.

8. The method of claim 1 wherein said transformed copy represents one or more of a scaling, rotation, deformation, and simplification of said replacement template.

9. The method of claim 1 wherein each template includes a set of components that are line segments.

10. The method of claim 1 wherein the first part of said choice function is selected from the group consisting of recursive replacement with deltas and threshold replacement.

11. The method of claim 1 wherein said shape is defined by more than one template.

12. A system to define a generated image that comprises:
 (a) a graphical representation for a template component;
 (b) user-interface tools to combine instances of said graphical representations into representations of templates;
 (c) user-interface tools to select a choice function that is used for drawing said image;
 (d) user-interface tools to define the color path corresponding to each template; and
 (e) user-interface tools to select a mixing function that is used for drawing said image.

13. The system of claim 12 wherein the user-interface tools are based on direct manipulation.

14. The system of claim 12 wherein each template includes a set of components that are line segments.

* * * * *